Patented July 20, 1948

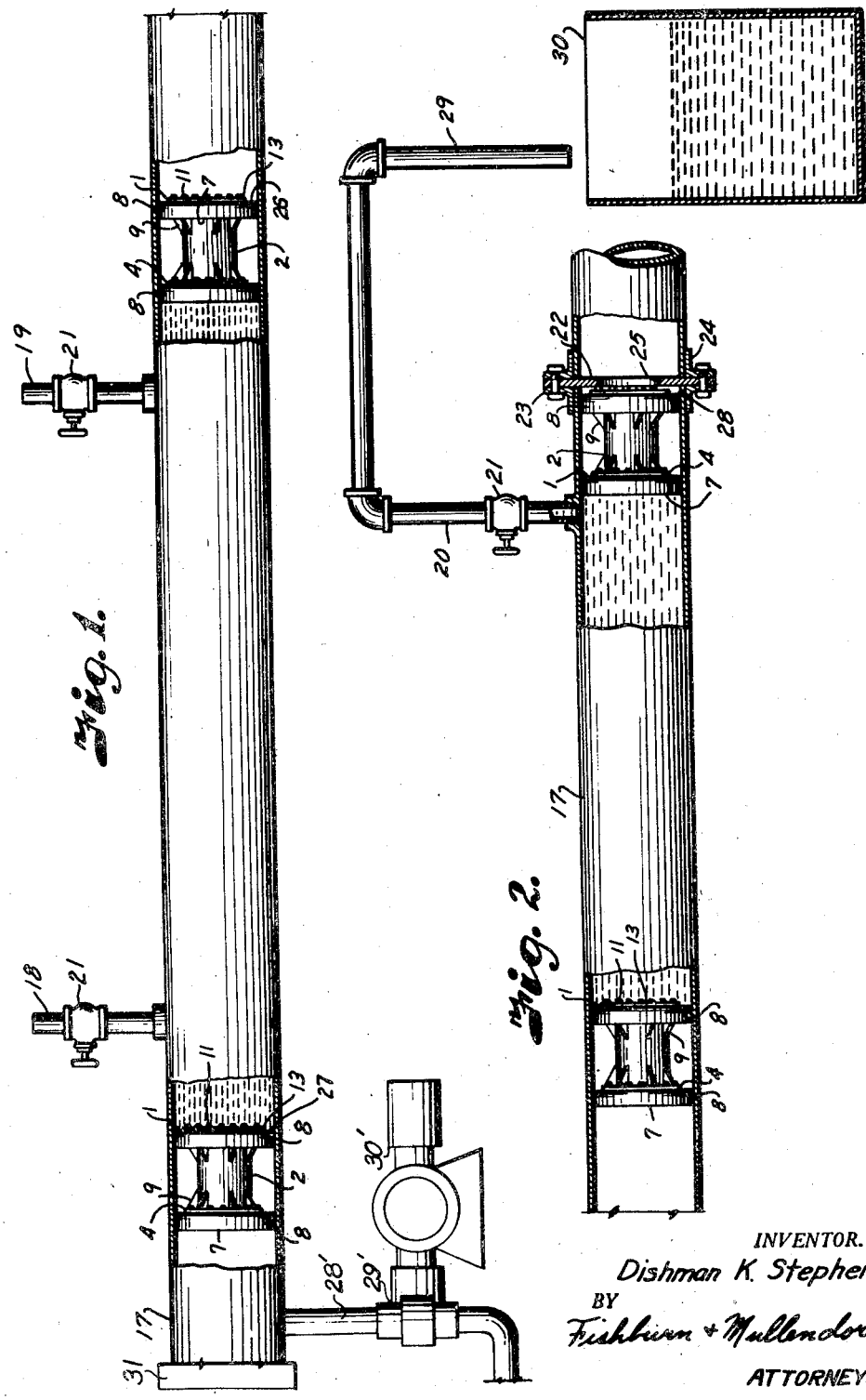

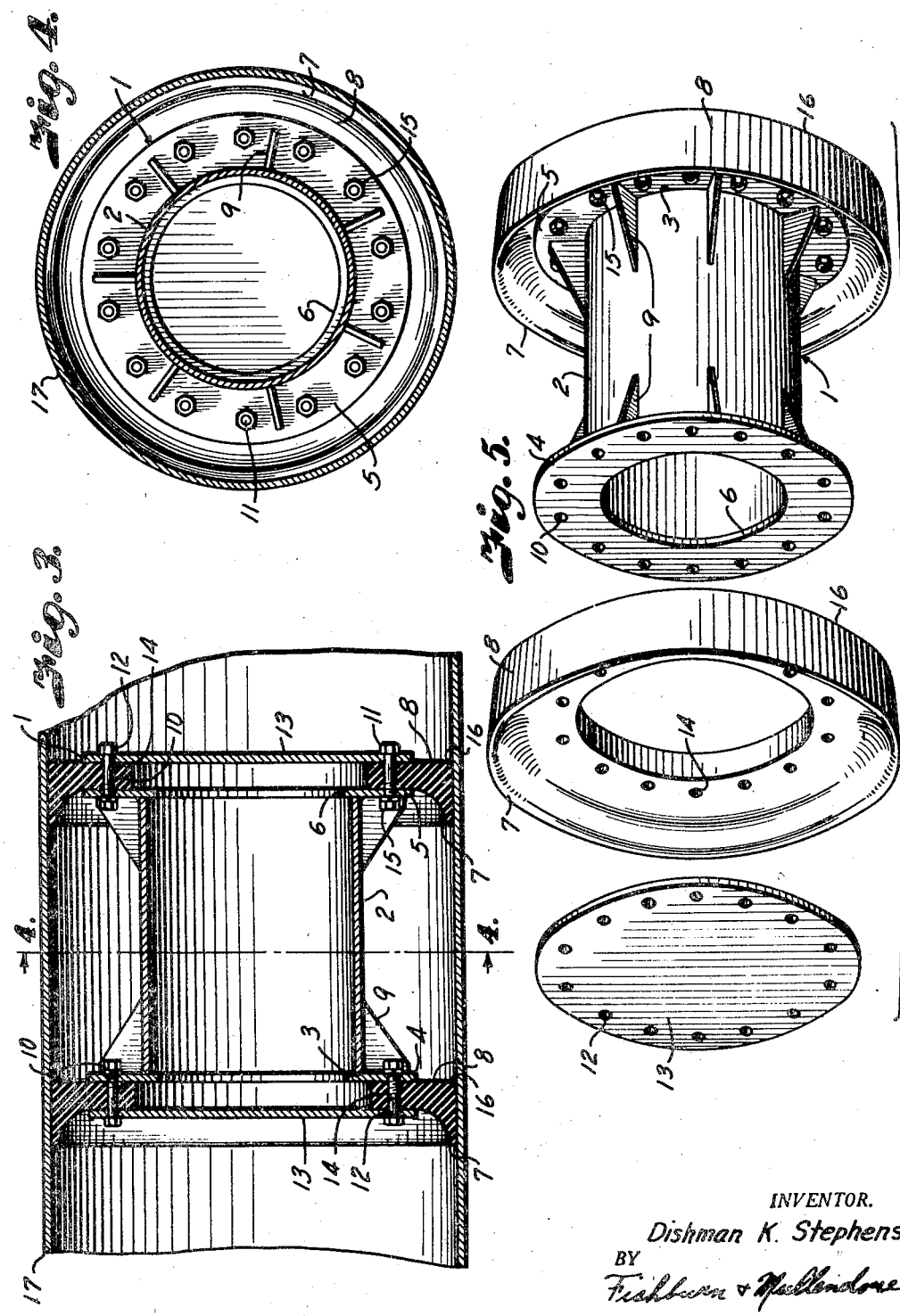

2,445,645

UNITED STATES PATENT OFFICE 2,445,645

APPARATUS FOR PAINTING THE INSIDE OF PIPE LINES

Dishman K. Stephens, Kansas City, Mo., assignor to Panhandle Eastern Pipe Line Company, Kansas City, Mo., a corporation of Delaware Application February 6, 1946, Serial No. 645,796

7 Claims. (Cl. 91—30)

This invention relates to an apparatus for coating or painting the inside of tubular members, and more particularly to an apparatus for coating or painting the inside of pipe lines employed for transmitting fluids such as natural gas.

The principal object of the present invention is to provide for coating the interior walls of the pipe lines by wiping and similar actions, as an incident to passing a plurality of swabs constructed in accordance with the present invention through the pipe lines to be coated or painted.

Other important objects of the present invention are to provide for confining coating material or paint in a pipe line between two swabs and moving said swabs through said pipe; to provide for employing a motive fluid, such as natural gas, ordinarily in the pipe line to be coated, as a power for driving the swabs and paint supply through the line; to provide for salvaging excess paint or coating material at the end of the length of pipe to be coated; to provide for venting the pipe line ahead of the swabs; to provide for filling the space in the pipe between the swabs with coating material to be applied to the interior of the pipe line; to provide a swab with a plurality of cups having flanges resiliently engaging the pipe walls for wiping the coating material thereon; to provide a fabricated swab of light weight for reducing drag or gravity effect providing an even coating over the inside of the pipe; to provide a durable, relatively economical and highly efficient pipe line painting swab; and to provide improved elements and arrangements of elements in an apparatus and sequences of steps in performing my method of coating the inside of pipe lines.

In accomplishing these and other objects of the present invention, I have provided improved details of structure, the preferred forms of which are illustrated in the accompanying drawings wherein:

Fig. 1 is an elevational view of a pipe line, portions being broken away to show the swabs, embodying the features of the present invention, in position for the filling of the space therebetween with material for coating the inside of the pipe line.

Fig. 2 is an elevational view of the end of the pipe line being coated, portions being broken away to show the position of the swabs during salvaging of excess coating material.

Fig. 3 is a detail longitudinal section through a swab and pipe line, particularly illustrating the relation of the resilient wiping elements to the body section.

Fig. 4 is a transverse section through the swab and pipe line on the line 4—4, Fig. 3.

Fig. 5 is a detail perspective view of the preferred form of swab, the parts being shown in disassembled spaced relation.

Referring more in detail to the drawings:

1 generally designates a swab constructed in accordance with the preferred form of the invention for use in the practice of my method of coating or painting the inside of pipe lines. The swab is preferably fabricated of steel sections and flexible wiping elements to provide a light weight construction having an air space therein to obtain a floating effect as it moves through the pipe line for spreading an even coat of paint or the like on the interior of said line. The swab preferably consists of a body section 2 of substantially tubular conformation terminating in squared ends 3 on which annular flanges 4 and 5 are secured preferably by welding. The flanges are in the shape of rings having concentrically arranged openings 6 of a diameter slightly smaller than the inside diameter of the body section 2. The outside diameter of the flanges is smaller than the inside diameter of the pipe to be coated to accommodate flexible lips 7 of packing rings 8 later described. To strengthen the flanges and their connection with the body section 2, a plurality of triangular gussets 9 are spaced around said body and welded thereto and the respective flanges 4 and 5. The flanges 4 and 5 are provided with spaced annularly arranged apertures 10 for passing fastening devices 11 which extend through aligned apertures 12 in circular plates or heads 13 of substantially the same outside diameter as the flanges 4 and 5, the heads 13 being adapted to close the ends of the body section 2 as later described.

The packing rings 8 preferably consist of duplicate resilient members formed of rubber or the like and have openings 14 therein alignable with the apertures 10 and 12 for passing the fastening devices 11 to mount the packing rings on the respective flanges 4 and 5. The packing rings are adapted to be retained in position on the respective flanges by the heads 13 and nuts 15 or the like which are mateable with the fastening devises 11 for drawing the relative parts together as illustrated in Fig. 3. The heads 13 having sealing engagement with the packing rings 8 close and seal the hollow interior of the swab body and the packing rings engage the inside walls of the pipe line so no gas will pass the swab as it moves through the line under pressure of the gas as later described.

In order to spread coating material evenly on the interior of a pipe line, the packing rings 8 are mounted on the body section with the flexible flanges on lips 7 thereon extending in the same direction and rearwardly of the direction of travel of said swab. The flexible lips 7 resiliently engage the interior surface of the pipe line and the forward peripheral edge 16 of the packing rings 8 is rounded to permit paint or coating material to enter and pass between the packing rings and the pipe line walls, said coating material being spread and wiped evenly over said walls by the pressure of the lips 7 against said walls.

In assembling the swab parts constructed as described, the flanges 4 and 5 are arranged concentrically on the respective ends of the body section 2 and welded thereto. The flanges are then reinforced by a plurality of triangular gussets 9 arranged in spaced relation around the periphery of the body section and welded thereto and to the flanges 4 and 5. The packing rings 8 are then arranged on the flanges 4 and 5 with the lips 7 thereof extending in the same direction or rearwardly of the direction of travel of the swab. The heads 13 are placed on the outer faces of the packing rings with the apertures 12 in alignment with the apertures 10 and 14 in the flanges 4 and 5 and the packing rings 8, fastening device 11 then being inserted through said aligned openings and nuts 15 applied to said fastening devices and tightened to draw the head and packing rings into seating abutment with the flanges 4 and 5.

A swab constructed and assembled as described is used in coating or painting the interior of pipe lines as follows:

The pipe line 17 is provided with vents such as pipes 18, 19 and 20 at selected intervals therealong, the vent pipe being provided with valves 21 to control the opening and closing of said vents. When it is desired to coat or paint the interior of a pipe line, it is preferable to paint a section at a time, said section being of from five to eight miles in length. The line is parted at the far end of the section to be painted as at a coupling and a stop 22 inserted in the line. The stop may be of any suitable structure, the form shown consisting of a plate of larger diameter than the pipe to provide flanges adapted to be engaged and secured to flanges 23 of members 24 sleeved over the ends of the pipe. The plate is provided with an orifice 25 of a size to permit flow of gas therethrough, and small enough that the plate will be engaged by the swab to stop forward travel of same. In proceeding with the painting operation, a swab is inserted in the near end of the line in the same manner as go-devils or like cleaning apparatus and moved to a point beyond a vent pipe 19 as indicated at 26 in Fig. 1. A second swab is inserted in the pipe line and moved forwardly to a point 27 to the rear of a vent pipe 18. The spacing between the two swabs must be such that two vent pipes are located in the line between the swabs and the capacity of the pipe closed by said swabs is sufficient to contain more coating material or paint than is required to coat the pipe line section to be painted. The valves 21 in the vents 18 and 19 are then opened and coating material poured into one while air or gas in the pipe line escapes through the other vent. The entire space is filled and all of the air emitted therefrom, then the valves 21 are closed. Compressed gas is supplied to the pipe line back of the second swab through a line 28' from a pump or compressor 29' operated by an engine 30'. 31 designates a closure member for the pipe. The gas pressure is transmitted through the paint to the forward swab to carry both swabs and paint through the pipe line. The paint passes between the forward packing ring and the pipe wall and is spread by the flexible lip on said ring, the second packing ring and lip thereon further spreading and wiping the paint to a thin, uniform coat over the entire inside of the pipe.

Before the swabs reach the end of the section of pipe line to be painted, a vent pipe 20 adjacent the stop 22 is opened. As the forward swab reaches the end of the section, it is stopped by the stop 22 as indicated at 28 at a point beyond the vent pipe 20. The gas pressure in the line behind the second swab then moves said swab forward, forcing the excess paint out the vent pipe 20 which is preferably provided with an extension 29 for directing the excess paint into a barrel or the like 30, thereby salvaging all excess paint. The stop 22 and members 24 are removed from the pipe line and the swabs drawn or forced out of said line. The ends of the pipe are then connected as by a conventional pipe coupling to restore said line to service.

The effect of a swab and pipe line coating method such as described is to create an effective coating or painting operation in which the total area of the interior surface of the pipe line is efficiently coated to smooth the walls and reduce friction and corrosion, thereby lengthening the life of the line and enhancing its efficiency in transmitting natural gas or the like from its source to the point of consumption.

What I claim and desire to secure by Letters Patent is:

1. In an apparatus for coating the interior surfaces of a pipe line, a pair of swab members adapted to be inserted into the pipe line in spaced relation, means for filling the space between the swab members with paint, fluid means for effecting movement of the swab members through the pipe line, means on the swab members for wiping paint onto the pipe walls incidental to the movement of said swabs in said pipe line, means in the pipe line for stopping movement of the forward swab, and means for discharging the paint from between the swabs in response to continued forward movement of the rearward swab after the forward swab engages said stop means.

2. In an apparatus for coating the interior surfaces of a pipe line, a pair of swab members adapted to be inserted into the pipe line in spaced relation, means for filling the space between the swab members with paint, means for removing the air from the space between said swabs, fluid means for effecting movement of the swab members through the pipe line, means on the swab members for wiping paint onto the pipe walls incidental to the movement of said swabs in said pipe line, a vent in the pipe line adjacent the end of the section being painted, and means in the pipe line for stopping movement of the forward swab at a point just beyond the vent whereby said vent opens into the space between said swabs, said paint being discharged from between the swabs through the vent in response to continued forward movement of the rearward swab to salvage all excess paint.

3. In an apparatus for painting pipe lines, a tubular body section, annular flanges on the ends of said body section, wiping members having rounded forward edges and rearwardly extending resilient flanges having engagement with the interior of a pipe line for wiping coating material on a pipe line, said wiping members being supported on the respective flanges of the body section, means for engaging the respective wiping members for holding said members on the flanges and closing the passage through the body section, and means for securing the plates to the flanges on the body section.

4. In an apparatus for painting pipe lines, a tubular body section, annular flanges on the ends of said body section, wiping members having rounded forward edges and rearwardly extending resilient flanges having engagement with the interior of a pipe line for wiping coating material on a pipe, said wiping members being supported on the respective flanges of the body section, plate members engaging the respective wiping members for holding said members on the flanges and closing the passage through the body section, and means for securing the plates to the flanges on the body section.

5. In an apparatus for coating the interior surfaces of a pipe line, a pair of spaced non-connected swab members in the pipe line, means for filling the space between the swab members with paint, fluid means for effecting movement of the swab members through the pipe line, and resilient means on said swab members having rearwardly directed flanges adapted to be expanded by the fluid means into engagement with the interior of the pipe line for wiping paint onto the pipe walls incidental to the movement of said swabs in said pipe line.

6. In an apparatus for coating the interior surfaces of a closed pipe line, a pair of spaced non-connected swab members in the pipe line, means for filling the space between the swab members with paint, means for applying fluid pressure in said pipe line to the rear of the rearmost swab member for effecting movement of the swab members through the pipe line, resilient means on said swab members having rearwardly directed flanges adapted to be expanded by the fluid pressure into engagement with the interior of the pipe line for wiping paint onto the pipe walls incidental to the movement of said swabs in said pipe line, and means for venting fluid pressure from the pipe line ahead of said swabs.

7. In an apparatus for coating the interior surfaces of a pipe line, a pair of non-connected swab members adapted to be inserted into the pipe line in spaced relation, means for filling the space between the swab members with paint, fluid means for effecting movement of the swab members through the pipe line, means on the swab members for wiping paint onto the pipe walls incidental to the movement of said swabs in said pipe line, means in said pipe line for stopping movement of the forward swab, and means for venting fluid pressure from the pipe line ahead of said swabs during forward movement of the forward swab and discharging the paint from between the swabs in response to continued forward movement of the rearward swab after stopping of the forward swab.

DISHMAN K. STEPHENS.

REFERENCES CITED

The following references are of record in the file of this patent:

UNITED STATES PATENTS

| Number | Name | Date |
|---|---|---|
| 907,724 | Boyle | Dec. 29, 1908 |
| 938,489 | James | Nov. 2, 1909 |
| 1,796,338 | Moore | Mar. 17, 1931 |

FOREIGN PATENTS

| Number | Country | Date |
|---|---|---|
| 311,319 | Great Britain | July 7, 1930 |